R. A. BROOKS.
FLUSHING APPARATUS FOR WATER CLOSETS.
APPLICATION FILED DEC. 22, 1916.
1,290,892.
Patented Jan. 14, 1919.
2 SHEETS—SHEET 1.
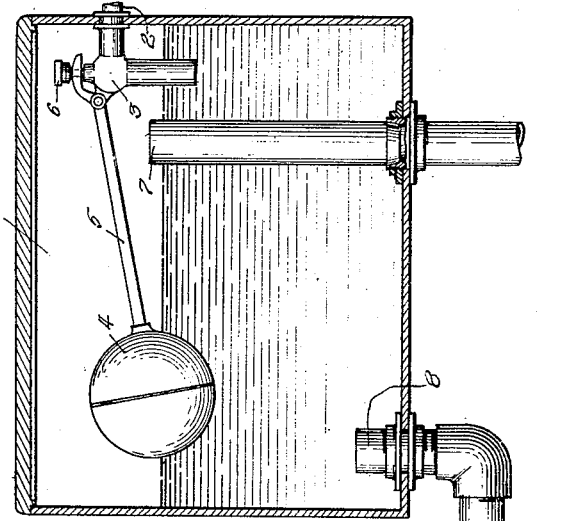
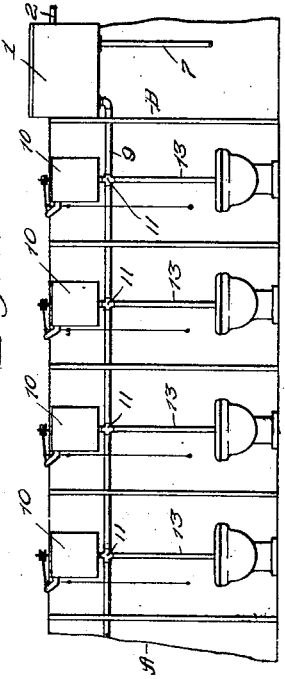
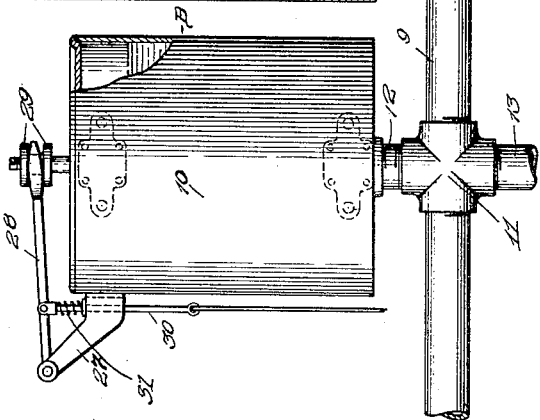
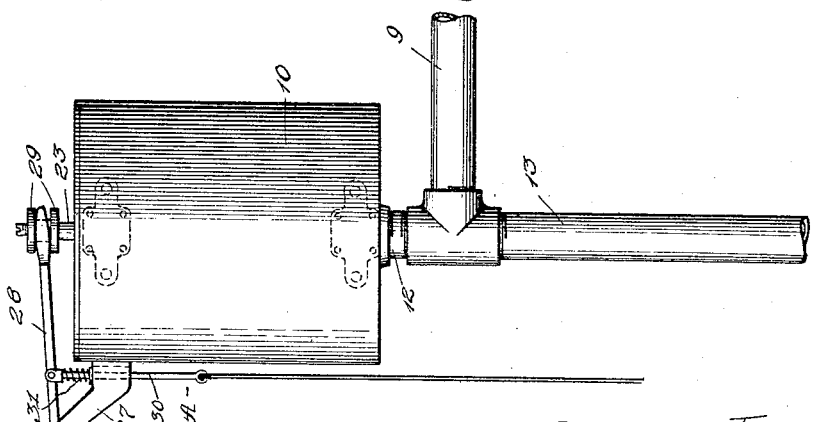
Inventor
Robert A. Brooks
By Rector, Hibben, Davis & Macauley
His Attys.

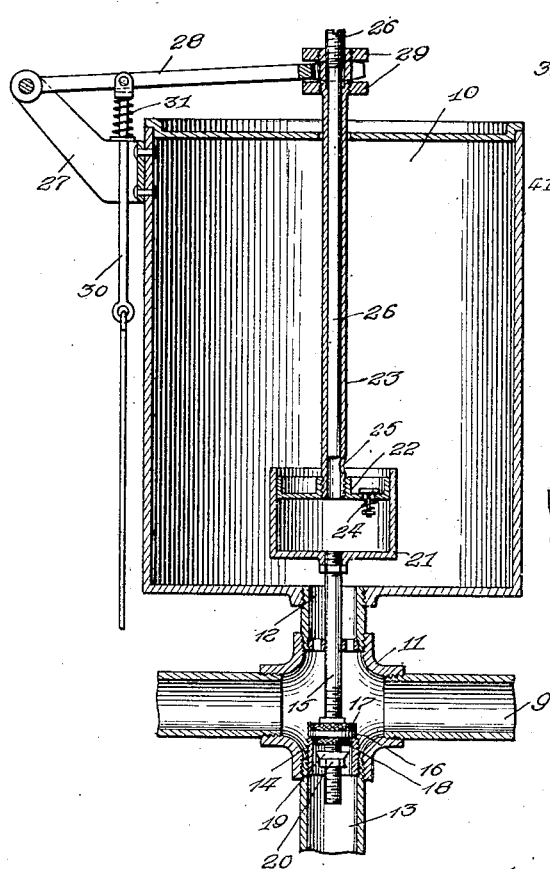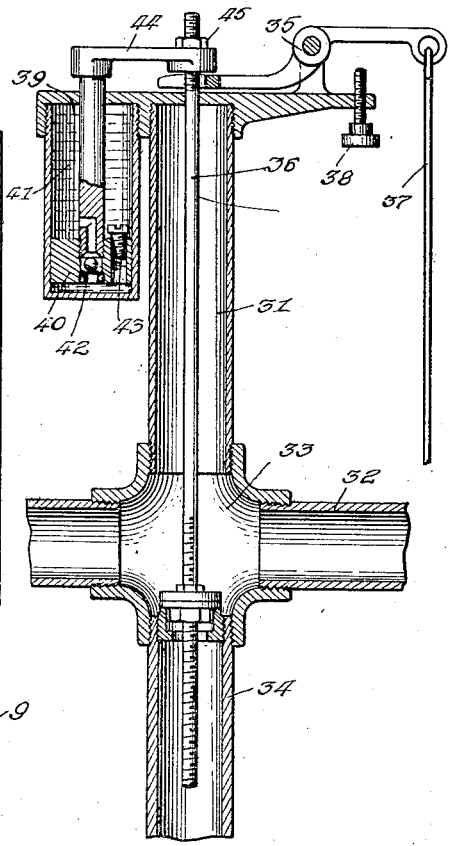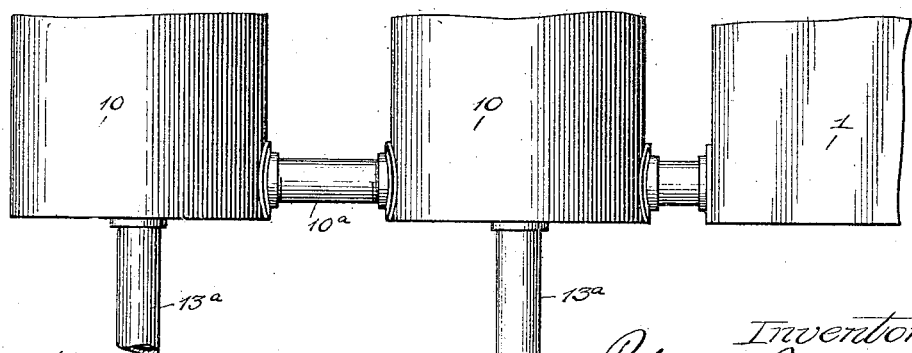

UNITED STATES PATENT OFFICE.

ROBERT A. BROOKS, OF CHICAGO, ILLINOIS.

FLUSHING APPARATUS FOR WATER-CLOSETS.

1,290,892.   Specification of Letters Patent.   Patented Jan. 14, 1919.

Application filed December 22, 1916. Serial No. 138,365.

*To all whom it may concern:*

Be it known that I, ROBERT A. BROOKS, a citizen of the United States, residing at Chicago, in the county of Cook and State of Illinois, have invented certain new and useful Improvements in Flushing Apparatus for Water-Closets, of which the following is a specification.

My invention relates to means for flushing a series or battery of water closets, and comprises an intercommunicating system of tanks or water pipes in which the water is maintained at a constant level by a common inlet valve from the service pipe through which water is supplied, thus enabling low pressure flushing devices to be used in all the closets. Under the conditions which ordinarily exist the pressure in the service main is relatively high, and the usual practice is to employ high pressure valves, or high pressure flushing devices of some kind, in each individual closet. As compared with low pressure valves and flushing devices these high pressure devices are subject to various defects which it is the principal object of my invention to obviate, or to minimize by using a single high pressure master valve. By the elimination of the high pressure valves thus dispensed with I do away with wastage of water caused by the cutting away of valve seats and packings incident to high pressure valves and frequently caused by a particle of matter or a deposit from the water getting between the valve and its seat, the escape of water being often accompanied by a disagreeable hissing noise while the valve or valve seat is being destroyed. I further dispense with all overflow pipes except one, located preferably in the main or master tank.

Because of the fact that I need to employ but a single high pressure ball cock valve, and the fact that the low pressure flushing apparatus used with the individual closets are relatively inexpensive, efficient and less liable to deterioration in service as compared with high pressure devices, my system is economical both in cost of installation and in cost of maintenance, and is also economical in consumption of water. I am also able to avoid various sources of annoyance incident to high pressure valves, such as vibration and water hammer when the valves are closing, leakage around the valve stems when the packing is too loose, or sluggish action or failure of the valve to act if packed too tightly,—these elements of trouble being all affected by variations in the water pressure.

Another and important objection which exists with respect to ordinary ball cock tanks directly connected with high pressure mains is that the water inlet openings are usually and preferably small, with the result that the tanks fill somewhat slowly. In large lavatory installations, the total efficiency or serviceability of the battery of closets is thus reduced. In case flushing valves are used it is necessary for sanitary reasons to install a special tank and pipe system to avoid the valves being connected to the supply main and the pipes which supply service fixtures for culinary or other purposes throughout the building. These defects, as will be seen from the description hereinafter given, are avoided by means of my invention.

As above indicated the object of my invention is the construction of a system of connected flushing apparatus particularly applicable to installations of a set of several closets, and which shall avoid the defects of previous apparatus and exhibit features of utility not heretofore realized. To this end I have devised apparatus embodying my invention in a preferred form, and also a modified form thereof, which will both hereinafter be particularly illustrated and described, though it will be understood that various other modifications may be made without departing from my invention.

In the drawings Figure 1 shows a series or battery of closets to which my invention is applied; Fig. 2 is a central vertical section through one of the individual closet tanks and its flushing devices; Fig. 3 illustrates a modified arrangement of the intercommunicating piping; Fig. 4 shows a modification of my invention having a modified form of water containers and a different arrangement of the flushing devices; and Fig. 5 shows diagrammatically a battery of closets.

The same reference characters indicate the same parts in all the figures of the drawings.

Referring first to Figs. 1 and 2, in which the preferred form of my invention is illustrated, the master tank 1 is supported in any suitable or convenient manner adjacent the line of closets A—B, at the usual height at which tanks used with ball cock valves are placed. Water from the service main 2 is admitted through a ball cock valve 3 of ordinary construction controlled by a float 4 at the end of a lever 5 operatively connected with the valve, regulation of the water level being attained by a regulating screw 6 through which the float 4 may be caused to open the valve at any desired position of such float. An overflow pipe 7, preferably removable, is provided to carry off any excess water which leakage or imperfect closing of the valve may give rise to.

The inner end 8 of the low pressure supply pipe 9 which leads to all the individual closet tanks of the system preferably extends somewhat above the bottom of the master tank in order to insure a supply free from sediment, the heavy sediment falling to the bottom of the tank, and any light particles floating on top. In the operation of my apparatus the master tank will never be completely emptied, or the level fall greatly, and floating particles of matter are therefore not liable to be drawn down into the supply pipe 9.

In each closet A, B, etc., of the battery or system of closets, an individual water container in the form of a tank 10 open at the top to atmospheric pressure is arranged at such height that the water line in the upper part of the tank will be at the level of the water line in the master tank. The tanks are all arranged to have free and unrestricted communication with each other, and a flushing pipe in each closet leads from the individual tank therein,—and consequently from the entire battery of intercommunicating tanks,—to the closet bowl in such closet. To this end the common supply pipe 9 is carried horizontally along the back of the line of closets at a convenient height, preferably shortly below the tanks 10, and by means of four-way connections 11 the sections of the supply pipe are connected to each other and the tanks 10 are each connected with their inlet openings 12 in alinement with the respective flushing pipes 13 of the closets.

The form of flushing device which is illustrated in Figs. 1 and 2, and which I have devised for the purpose of carrying out my invention, consists of a main flushing valve operated mechanically through a cylinder and piston arranged to act as a retarding device governing the closing movement of the main valve. Describing in detail the construction shown, the main valve seat 14 is screwed into the depending nipple of the connection 11. The lower end of the valve stem 15 is threaded to receive the main valve consisting of a washer 16 of leather or other suitable material clamped firmly between nuts 17 and 18. A short distance below the nut 18 is arranged a regulating disk 19 which may be screwed up or down on the stem to govern the restricted refill flow through the valve after the main flushing flow has ended. By screwing the regulating disk up on the stem the refill flow will be shorter, and by screwing it down the length of such flow will be greater. A lock nut 20 is provided to maintain the disk 19 in adjusted position.

To the upper end of the valve stem 15 is secured a cylinder 21 formed to receive a loose-fitting piston 22 provided with a stem 23 which extends upwardly and loosely through the top of the tank 10. An upwardly-opening check valve 24 is arranged to permit free flow of water from within the cylinder to the outside thereof, and a restricted opening 25 is provided to allow gradual flow from without to the space inside. In the present instance the restricted opening is made adjustable in size by making the piston stem 23 hollow and providing a regulating plug 26 having screw-threaded engagement therewith and arranged to cover and uncover more or less of the opening according to its position.

Pivotally mounted in a bracket 27 secured to the margin of the top of tank 10 is a forked lever 28 the prongs of which embrace the piston stem 23 between a pair of washers 29, 29 screw-threaded on said rod. A pull rod 30 is pivotally connected with said lever 28 and extends downward through a hole in the bracket 27, and a spring 31 is arranged around said pull rod intermediate the bracket and lever and serves to yieldingly maintain said lever and the piston connected to it in an uppermost normal position. It will be understood that the pull rod is adapted to be operated by the ordinary chain and handle pull, or equivalent connections.

The operation of my improved apparatus is as follows: When water is turned on in the service pipe 2 it will flow through the ball cock valve 3 into the master tank 1 and through the low pressure supply 9 into the tanks 10 of all the closets until the water in the tanks reaches a level determined by the adjustment of the float in the master tank, when the action of the float will close the valve 3. Upon the operation of the pull rod 30 of the apparatus in any closet the lever 28 will be drawn downward forcing the piston 22 to lowermost position in the cylinder, the water therein escaping through the check valve 24, and the spring 31 being compressed. When the pull is released the spring 31 will lift the lever and connected piston to upper position, and since the check valve closes and the restricted opening 25 permits only a limited flow of water the cylinder 21 will also be lifted and with it the valve stem 15 and main flushing valve parts carried by it, and a free flush of water will take place through the flushing pipe 13. The cylinder and connected parts will then gradually descend to their original or normal position at a speed determined by the adjustment of the regulating plug 26. It will be noted that the cylinder 21 is of considerable size and weight so as that it may contain a considerable volume of water and permit the plunger to be made so loose as to prevent any liability of binding in the closing movement of the flushing valve. A cylinder three inches in diameter and having an area in cross-section of approximately seven inches, though made loose fitting, will exert a lifting force of one hundred pounds or more, and since the pressure on top of the flushing valve is at most but a few pounds it is unseated with absolute certainty. The weight of the cylinder insures that it will seat itself, though spring tension means tending to yieldingly force the valve to its seat may also be employed to assist the force of gravity if desired.

While the arrangement above described and including a common supply pipe 9 which by four-way connections communicates with the tanks 10 and their flushing pipes 13 is a convenient one, it will be understood that as illustrated in Fig. 3, the tanks 10 may communicate directly with each other through pipes 10$^a$, and that the flushing pipes, marked 13$^a$, need not communicate with the water in the master tank 1 except through the respective closet tanks 10 and the pipes 10$^a$ connecting them. In any case, since the tanks are in free communication with each other, the water used at any one flushing operation is drawn equally from the entire battery of tanks, and but a slight fluctuation of level can occur in the ordinary use of the closets.

It will be noted that inasmuch as the depression of the pull rod does not directly open the flushing valve it is impossible to hold the valve open, with resultant waste of water, and since the closing of the flushing valve when it is operated by the release of the pull is automatically governed by the adjustment of the regulating plug 26, the valves of the system may be set to operate without waste, and a minimum consumption of water will take place.

In Fig. 4 I have illustrated a modified form of my invention in which the water containers of the closets are in the form of short stand pipes 31 respectively connected to a relatively large supply pipe 32 by means of the four-way unions 33 at the upper end of the flushing pipe 34. The flushing valve of this modified construction is similar to that hereinbefore described, and is arranged to be lifted to flush the closet by means of a pivoted lever 35, the forked inner end of which is arranged to lift the stem 36 of the valve and the outer end of which is adapted to be acted upon by a chain pull 37, a set screw 38 being provided to adjustably limit the movement of the parts. The closing movement of the flushing valve is governed by a retarding valve 39, which, as illustrated, in the present instance comprises a piston 40 working in a closed cylinder containing a body of oil 41, or other suitable liquid. The piston head carries an upwardly-closing ball check valve 42 governing a passage extending through it and is also provided with a regulating screw 43 by the adjustment of which the size of a restricted orifice through the valve head may be regulated. The upper end of the valve stem is equipped with a laterally-extending arm 44 which has screw-threaded connection with the upper end of the piston stem 36, a lock nut 45 being provided for increased security.

The operation of this modified form of flushing apparatus will readily be understood without extended description. By the operation of the pull the flushing valve is lifted to flush the closet connected with it, and the retarding valve is lifted with the flushing valve, the check valve 42 (which is normally in lowermost open position) permitting the oil to pass from above the piston to the space below. When the pull is released the ball check is carried by an initial flow of oil to its seat and the flushing valve and retarding valve descend together at a rate determined by the adjustment of the regulating screw 43 of the last mentioned valve.

So far as respects the advantages arising from the use of a single admission valve in a single master tank, and low pressure flushing valves in the individual closets, all the forms of my invention herein described are alike, but it may be here explained that in the modification last described the storage or reserve capacity of water which is inherent in the preferred form and modification shown in Fig. 3 is in a considerable measure lacking, and the flow of water necessary to produce a simultaneous flush in several closets (under the conditions existing when several flushing valves are operated at the same time) is drawn directly through the large supply pipe 32, which is made of ample size to flush the maximum number of closets liable to be flushed at one time. It will be noted that this modified form of my invention is applicable chiefly to situations in which the size of the service pipe and the pressure therein are adequate to furnish sufficient flow through the high pressure valve to maintain the maximum flow of water through the master tank and supply pipe to the flushing pipes, since the direct flow of water through the high pressure valve, rather than the storage capacity of the master tank and connected supply pipe, is relied upon to maintain the flow through the flushing valves, whereas the combined storage capacity of the individual tanks and master tank of the preferred form of my invention enables it to be used where of the service pressure is relatively low, or varies greatly from time to time. The specific relationship and organization of parts which in the respects referred to characterize the modified form of my invention are therefore not herein claimed, but are reserved as the subject matter of a separate application.

I claim:

1. Flushing apparatus for a battery of water closets comprising a master tank, means for maintaining water at a constant level therein, a series of water containers individual to the closets arranged to contain water at the water level of the master tank and in free and unrestricted communication therewith, and flushing valves for the respective closets arranged adjacent the individual water containers.

2. Flushing apparatus for a battery of water closets comprising a master tank, means for maintaining water at a constant level therein, a water conduit in free and unrestricted communication with such tank extending through all the closets and arranged to contain water at the water level of the master tank, and flushing valves for the respective closets arranged in said water conduit.

3. Flushing apparatus for a battery of water closets comprising a master tank, means for maintaining water at a constant level therein, a series of tanks arranged respectively in the individual closets, said tanks being arranged to contain water at the water level of the master tank and all said tanks having free and unrestricted communication with each other, and flushing valves for the respective closets arranged adjacent the tanks.

4. Flushing apparatus for a battery of water closets containing a master tank, means for maintaining water at a constant level therein, a series of water containers individual to the closets arranged to contain water at the water level of the master tank, a common supply pipe in free and unrestricted communication with said master tank and also with said series of water containers, flushing pipes communicating with said supply pipe and containers, and flushing valves arranged to control the flow of water through said flushing pipes.

5. Flushing apparatus for a battery of water closets comprising a master tank, a high pressure admission valve therein governed by the height of water in said tank, a water conduit in free and unrestricted communication with such tank extending through all the closets, said conduit being open to atmospheric pressure and arranged to contain water at the water level of the master tank, and flushing valves for the respective closets arranged at the bottom of said conduit.

6. Flushing apparatus for a battery of water closets comprising a master tank, a high pressure admission valve therein governed by the height of water in said tank, a series of water containers individual to the closets, said containers being open to atmospheric pressure and arranged to contain water at the water level of the master tank and all said containers being in free and unrestricted communication with each other, and flushing valves for the respective closets arranged at the bottom of the respective containers in such closets.

7. Flushing apparatus for a battery of water closets comprising a master tank, a high pressure admission valve therein governed by the height of water in said tank, a series of water containers individual to the closets, said containers being open to atmospheric pressure and arranged to contain water at the water level of the master tank, a common supply pipe in free and unrestricted communication with said master tank and also with said series of water containers, flushing pipes communicating with and extending downwardly from said supply pipe, and flushing valves arranged at or below the lower level of said supply pipe and respectively controlling the flow of water through said flushing pipes.

8. Flushing apparatus for a battery of water closets containing a master tank, means for maintaining water at a constant level therein, a series of water containers individual to the closets arranged to contain water at the water level of the master tank, a common supply pipe in free and unrestricted communication with said master tank and also with said series of water containers, flushing pipes communicating with said supply pipe and containers, flushing valves arranged to control the flow of water through said flushing pipes, said containers and valves being arranged in vertical alinement, and each flushing valve having a stem extending upwardly in its associated containers, and retarding means connected with each said valve stem.

9. Flushing apparatus for a battery of water closets containing a master tank, means for maintaining water at a constant level therein, a series of water containers individual to the closets arranged to contain water at the water level of the master tank, a common supply pipe in free and unrestricted communication with said master tank and also with said series of water containers, flushing pipes communicating with said supply pipe and containers, flushing valves arranged to control the flow of water through said flushing pipes, said containers and valves being arranged in vertical alinement, and each flushing valve having a stem extending upwardly in its associated container, operating means coöperating with the upper end of each stem and means for retarding the closing movement of each valve.

10. Flushing apparatus for a battery of water closets comprising a master tank, means for maintaining water at a constant level therein, a series of tanks arranged respectively in the individual closets, said tanks being arranged to contain water at the water level of the master tank and all said tanks being in free and unrestricted communication with each other, flushing pipes in vertical alinement with said tanks, flushing valves arranged to control the flow of water through said flushing pipes, said valves having stems extending upwardly into said tanks, and operating connections for each of said valves, each connection including a retarding device coöperatively connected with the upper end of its associated valve stem.

11. Flushing apparatus for a battery of water closets comprising a master tank, means for maintaining water at a constant level therein, a series of tanks arranged respectively in the individual closets, said tanks being arranged to contain water at the water level of the master tank and all said tanks being in free and unrestricted communication with each other, flushing pipes in vertical alinement with said tanks, flushing valves arranged to control the flow of water through said flushing pipes, said valves having stems extending upwardly into said tanks, and operating connections for each of said valves, each connection including a piston-and-cylinder slow-closing device arranged within its associated tank, one member of said device being fixed to the upper end of the valve stem.

12. Flushing apparatus for a battery of water closets comprising a master tank, means for maintaining water at a constant level therein, a series of tanks arranged respectively in the individual closets, said tanks being arranged to contain water at the water level of the master tank and all said tanks being in free and unrestricted communication with each other, flushing pipes in vertical alinement with said tanks, flushing valves arranged to control the flow of water through said flushing pipes, said valves having stems extending upwardly into said tanks, and operating connections for each of said valves, each connection including a cylinder within said tank secured to the upper end of its associated valve stem, a piston in said cylinder having a stem passing upwardly above the water line, an outwardly-opening check valve arranged to permit water to pass freely from within the cylinder chamber to the outside thereof, said piston being formed to provide a restricted pathway between its opposite sides permitting limited flow of water, and means coöperating with the upper end of said piston stem to reciprocate it.

13. Flushing apparatus for a battery of water closets comprising a master tank, means for maintaining water at a constant level therein, a series of tanks arranged respectively in the individual closets, said tanks being arranged to contain water at the water level of the master tank and all said tanks being in free and unrestricted communication with each other, flushing pipes in vertical alinement with said tanks, flushing valves arranged to control the flow of water through said flushing pipes, said valves having stems extending upwardly into said tanks, and operating connections for each of said valves, each connection including a cylinder within said tank secured to the upper end of its associated valve stem, a piston in said cylinder having a stem passing upwardly above the water line, an outwardly-opening check valve arranged to permit water to pass freely from within the cylinder chamber to the outside thereof, said piston being formed to provide a restricted pathway between its opposite sides permitting limited flow of water, spring-tension means for maintaining said piston stem in uppermost position, and means for depressing said piston stem against the stress of said spring tension means.

ROBERT A. BROOKS.

Copies of this patent may be obtained for five cents each, by addressing the "Commissioner of Patents, Washington, D. C."